United States Patent Office 2,882,978
Patented Apr. 21, 1959

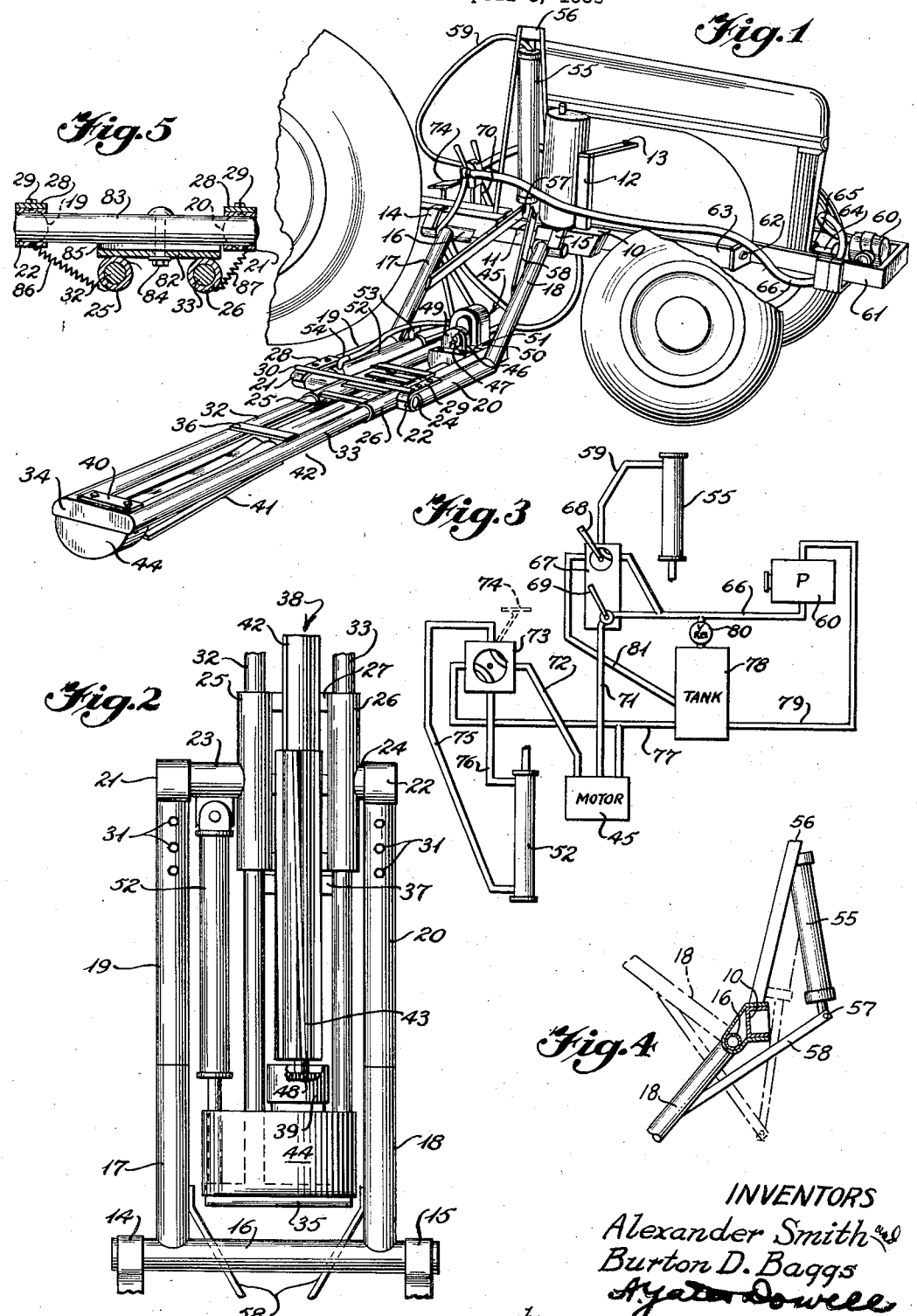

2,882,978

UNDER TREE CULTIVATOR

Alexander Smith and Burton D. Baggs, Sanford, Fla.

Application April 3, 1953, Serial No. 346,632

13 Claims. (Cl. 172—79)

This invention relates to agricultural implements used on farms, in groves and the like where large areas are mowed and/or hoed. The invention relates particularly to machines which are power-driven so that it is possible for a single operator to attend a relatively large area.

In groves where citrus fruits and other products are grown, the weight of the fruit frequently causes limbs substantially to reach the earth and in order not to injure the trees and the fruit, it is customary to cultivate around the trees and leave the soil beneath the trees uncultivated.

It is desirable, at least at times, to operate beneath the low hanging branches of trees as well as beneath and around other objects and obstructions. In doing this, it is desirable to have a machine or implement which can be retracted to avoid the trunk of the tree or other obstruction but which will operate close to said trunk and will retract the operating mechanism so that the cutting element can pass the tree without striking the same.

It is an object of the invention to provide an attachment for a tractor by means of which cutting and/or cultivation can be carried on in a straight line beneath and in close proximity to trees or other relatively low objects, and the mechanism retracted to prevent striking trees or other obstructions during the travel of the cultivator.

Another object of the invention is to provide a cultivator attachment which can be readily applied to a conventional tractor and including a rotary cutter element mounted for movement from an inoperative upright position to an operative horizontal position and with the rotary cutter element retractable in its mounting and with a hydraulic mechanism for swinging a first frame from a horizontal to an upright position and for reciprocating a second frame and simultaneously driving the cultivator mechanism.

A further object of the invention is to provide hydraulic mechanism for rotating the cutter or earth engaging cultivator structure, for reciprocating the same endwise and transversely of the path of movement of the vehicle, and for raising and lowering the cultivator mechanism.

Other objects and advantages of the invention will become apparent from the following description in conjunction with the accompanying drawing in which:

Fig. 1 is a perspective with parts broken away illustrating one application of the invention with the parts in operative position;

Fig. 2, a fragmentary bottom elevational detail;

Fig. 3, a diagrammatic view of the hydraulic system;

Fig. 4, a fragmentary sectional detail of a portion of the operating mechanism; and Fig. 5, a transverse section of the vertical pivotal mounting of the cutter carrying frame on the pivoted frame.

Briefly stated, the invention comprises a structure for application to a conventional tractor and including a frame member attached to one side of the tractor to which is pivotally connected an elongated supporting frame swingable from a horizontal to an upright position pivotally supporting a cradle in its outer end, in which cradle is slidably mounted the intermediate portion of a frame in which the intermediate portion of the rotary cutter mechanism is longitudinally slidable. The mechanism being operated hydraulically from the motor of the supporting vehicle so that when the first frame is in horizontal position and the cutting mechanism driven, the frame which carries the cutting mechanism may be reciprocated to retract the same and prevent contact with a tree or other object which might be damaged or cause damage to the cultivator.

Onto the tractor is mounted an elongated auxiliary frame member 10, having horizontal and vertical portions connected at one edge, or in other words, an angle member L-shape in cross-section. The rear end of this auxiliary frame member is connected by a conventional U-bolt (not shown) around the rear axle housing (not shown) of the tractor.

A brace 11 has one end connected to the forward end portion of the auxiliary frame member 10 and its other end held by a brace to the fly-wheel housing (not shown). A second brace 12 has one end connected to the auxiliary frame member 10 and its other end held by one of the cylinder head bolts 13 to the engine.

Lugs or hinge members 14 and 15 are attached to or carried by the auxiliary frame member 10 and in turn form bearings for a frame having an end or cross-bar 16 and integral side bars 17 and 18, with parallel extensions 19 and 20 having bearing sleeves 21 and 22. In the bearing sleeves 21 and 22 are received small pivot sleeves or members 23 and 24, which form cradle arms or pivots on opposite sides of parallel cradle members or sleeves 25 and 26 fastened together by a series of bars 27 welded or otherwise secured across their upper surfaces, three of such bars being shown for purposes of illustration.

The outer ends of the extensions 19 and 20 have braces 28 and 29 attached thereto which braces are connected by a rod 30 welded or otherwise attached and the braces 28 and 29 being secured to the extensions 19 and 20 by bolts 31. Within the cradle sleeves 25 and 26 is mounted a cutter frame composed of side members 32 and 33 connected at their inner and outer ends by end members 34 and 35 and reinforced by cross bars 36 and 37 disposed one at each side of and in spaced relation to the supporting cradle to permit limited lengthwise movement of the frame in said cradle.

Within the cutter frame is mounted a rotary cutter 38 mounted in suitable bearings for example by means of conventional pillow blocks 39 attached to a mounting bracket 40 at each end of the same. The cutter 38 has three sets of spiral blades 41, 42 and 43 and with each blade forming a gentle curve or curving spirally from end to end approximately 30° or $\frac{1}{12}$ of a revolution, there being four blades in each set extending substantially $\frac{1}{3}$ of the length of the cutter with the blades of the second set disposed approximately $\frac{1}{3}$ of a revolution from the blades of the first set and the blades of the third set disposed approximately $\frac{1}{3}$ of a revolution from the blades of the second set. The example of the manner in which the blades may be applied is merely for the purpose of illustration and the invention is not limited thereto.

At each end of its underside the cutter frame is provided with a skid 44 so that when the frame with the cutter supported therein is lowered into contact with the earth, it will be caused to assume a position parallel to the earth regardless of the terrain or inclination thereof.

The cutter is driven from a hydraulic motor 45 by means of a small sprocket chain 46 extending around a sprocket 47 of the motor and a sprocket 48 on the cutter 38. If desired, a casing 49 may be provided to cover these working parts in order to protect them from earth or foreign matter.

The hydraulic motor 45 is attached by bolts 50 to brackets 51 at each side of the frame. The cutter frame and cutter carried in the sleeves 25 and 26 of the rocking cradle is mounted for endwise movement so that the cutter can be retracted, to avoid striking a tree or other fixed object, and then returned to their normal position. In order to produce endwise movement of the cutter frame and cutter carried thereby, the hydraulic cylinder 52 has its piston rod pivotally attached to the inner end member 35 of the cutter frame and its opposite end pivoted to the cradle arm 23. The hydraulic cylinder 52 is connected to a source of hydraulic fluid so that when such fluid is introduced through the connection 53 the cutter will be projected and when hydraulic fluid is introduced through the connection 54 it will be retracted.

A second hydraulic cylinder 55 is provided for swinging the cutter between operative horizontal position and an upright inoperative position. Said cylinder has a yoke bracket 56 mounted on the auxiliary frame 10 and has its piston rod connected by a pivot 57 with a pair of arms or braces 58 welded or otherwise attached to the cross bar 16 and to the intermediate portions of the side bars 17 and 18. The cylinder is supplied with hydraulic fluid from a source of supply through a supply line 59 whereupon the cross bar 16 will be rocked in its pivotal mounting to elevate the cutter and when the fluid is released the cutter can lower by gravity.

In the use of the device the cutter will be maintained in elevated position by any desired holding means and can be lowered by releasing hydraulic pressure within the cylinder 55. Hydraulic fluid supplied to the motor 45 will produce rotation of the cutter and when an obstruction is approached, hydraulic fluid may be supplied through the connection 54 to cause endwise retraction of the cutter so that the tree can be passed. Thereafter hydraulic fluid introduced into the connection 53 will project the cutter to its original extended operative position. When the use of the cutter is discontinued for a time, the cutter can be raised by the introduction of hydraulic fluid into the cylinder 55.

The hydraulic system ordinarily will be independent of that of the tractor because of the fact that the hydraulic system of the tractor does not have sufficient volume. The independent hydraulic system comprises a gear pump 60 mounted on a U-shaped bracket 61 attached by bolts 62 to the front ends of frame members 63 of the tractor. The shaft 64 of such pump is connected by a universal coupling 65 with the crank shaft of the tractor engine.

A flexible conduit 66 supplies hydraulic fluid from the pump to a multiple valve 67 by means of which distribution of the fluid is controlled by operating levers 68 and 69, such valve being attached by bracket 70 to the auxiliary frame member 10. The flexible conduit 59 extends to the hydraulic cylinder 55 and a flexible conduit 71 extends from the motor valve to the motor 45.

A flexible conduit 72 connects the motor 45 with a second multiple valve 73 provided with a pivoted foot control 74 by means of which hydraulic fluid may be supplied to the cylinder 52 through flexible connections 75 and 76 to retract and project the cutter. Due to the arrangement of the flexible connection such projection and retraction is possible only while the motor 45 is rotating the cutter. When the multiple valve 73 is in the inoperative position hydraulic fluid from the motor will pass through a connection 77 to a receiving or storage tank 78 which in turn is connected to the pump through a flexible conduit 79.

If desired a relief valve 80 may connect the supply line 66 from the pump directly to the tank and operate to relieve the pressure in the event stoppage should occur and the pressure increases to a predetermined value. The control valve 67 is provided with a line 81 which extends to the tank 78 to permit hydraulic fluid from the cylinder 55 to pass through the lines 59 and 81 to the tank in the lowering of the cutter. Fluid from the second multiple valve 73 passes through the line 77 into such tank when it is bled from such valve when the hydraulic fluid is bled from the hydraulic cylinder 52.

It will be apparent that the present invention comprises a frame having one end pivotally mounted on the tractor or other vehicle so that such frame is swingable upwardly from an operative lower position to an inoperative position and between the outer ends of said frame is pivoted a supporting yoke within which a cutter carrying frame is slidable, this cutter carrying frame including vegetation cutting earth treating member and the ends of said cutter carrying frame being provided with earth engaging skids to cause such frame and the cultivator mechanism to assume a position parallel to the surface of the earth to which the device is applied. Since the cutter carrying frame is slidable in the yoke it can be retracted to avoid a tree or other objection, such retraction and swinging of the first frame as well as the actuation of the cutting element being hydraulically operated from the hydraulic system of the supporting vehicle or from an independent hydraulic system. In the use of the device, if an obstruction is encountered, the frame and cutting mechanism will travel in a circular path around the obstruction due to slippage. If desired, the connection between the cradle in which the reciprocating frame is mounted and the arms 25 and 26 can be modified as shown in Fig. 5 by providing a plate 82 and welding or otherwise securing the same to the cradle sleeves 25 and 26 and by providing pivot bar 83, the outer ends of which are located in bearing sleeves 21 and 22 and such bar 83 being rotatably connected to the bearing plate 82 by means of a bolt 84. An additional wear bearing plate 85 being disposed between the bar 83 and the plate 82 if desired and being attached to the bar 83 by welding or otherwise secured if preferred although such is not necessary. For this construction the cultivator frame can swing about the vertical pivot bolt 84 and as illustrated it will be located at an elevation slightly below that of the bearing sleeves 21 and 22. With such construction if an obstruction is encountered before the cultivator mechanism is retracted it can yield without subjecting the entire mechanism to the shock which it would otherwise receive. Desirably, resilient means such as coil springs 86 and 87, which respectively connect the cradle sleeves 25 and 26 to the adjacent bearing sleeves 21 and 22, may be provided to insure the return of the cultivator frame to normal aligned position after the obstruction has been passed.

It will be obvious to those skilled in the art that various changes may be made in the invention without departing from the spirit and scope thereof and therefore this invention is not limited by that which is shown in the drawing or described in the specification, but only as indicated in the appended claims.

What is claimed is:

1. A cultivator comprising a mounting vehicle having a power-plant for driving the same, a first frame pivoted to said vehicle and movable from a substantially horizontal to an upright position, a second frame pivoted at the outer end of the first frame and swingable in a plane corresponding to that of the first frame, and slidable in its mounting whereby it may be projected and retracted, and a rotary member carried by said second frame, a shoe attached to each end of said second frame so that when said second frame is lowered it will accommodate itself to the terrain, a hydraulic pump driven by said power-plant, means for supplying hydraulic fluid for propelling and retracting said second frame, for rotating said cutter, and for raising and lowering said first frame for moving said cutter from an operative substantially horizontal position to an inoperative elevated position.

2. A cultivator for operating beneath relatively low objects comprising a supporting structure, an elongated frame having one end pivoted about a horizontal axis on said supporting structure, said elongated frame having substantially one-half disposed at an angle to the other half whereby the mounted end of the frame will be inclined when the other end of the frame is in a substantially horizontal position, a second elongated frame having its intermediate portion slidably and pivotally mounted on said first frame, and earth working means carried by said second frame.

3. In a cultivator, supporting structure, a frame comprising an end member pivotally mounted on said supporting structure, parallel side members carried by said end member, a pair of parallel extensions carried by said side members at an angle thereto whereby the plane of the extensions will be spaced from the plane of said end member, a cradle pivoted between said extensions and having an opening disposed lengthwise of said extensions, a frame movable endwise in said opening, and earth working means disposed lengthwise of and movable endwise with said frame.

4. In a cultivator, supporting structure, a frame comprising an end member pivotally mounted on said supporting structure, parallel side members carried by said end member a pair of parallel extensions carried by said side members at an angle to the same so that the plane of the extensions will be spaced from the plane of said end member, a cradle pivoted between said extensions and having an opening disposed lengthwise of said extensions, a frame journaled endwise in said opening, an earth working means disposed lengthwise of and movable endwise with said frame, and operating means for swinging the structure in a manner to raise and lower the same, for moving said cutter frame endwise, and for driving said cutter.

5. An attachment for a tractor for cultivating beneath low objects comprising an elongated cutter having a series of axially disposed spiral uniformly offset blades, an elongated frame supporting said cutter and having a skid on each end for determining the relative position of the same relative to the surface cultivated, means for mounting said frame in a manner to permit axial movement of the same, power means for producing such axial movement and for driving said cutter, said mounting means comprising an elongated frame, a cradle pivoted on one end of said frame, and a mounting structure pivotally supporting said frame at its other end, so that swinging of said frame will cause said cutter to be carried with it, and means for producing said swinging action.

6. A cultivator comprising a mounting vehicle having a power-plant for driving the same, a first frame pivoted to said vehicle and movable from a substantially horizontal to an upright position, a second frame pivoted on both horizontal and vertical pivots at the outer end of the first frame and swingable in a plane corresponding to that of the first frame and in a horizontal plane and also being slidable in its mounting whereby it may be projected and retracted and yield horizontally upon contact with an obstruction, a rotary cultivator member carried by said second frame, a shoe attached to each end of said second frame so that when the cultivator member is lowered it will accommodate itself to the terrain, a hydraulic pump driven by said power-plant, means for supplying hydraulic fluid for propelling and retracting said second frame for rotating said cultivator member and for raising and lowering said first frame for moving said cultivator member from an operative substantially horizontal position to an inoperative elevated position.

7. In a cultivator a first frame pivoted at one end so that its other outer end can be raised and lowered, a second frame pivotally and slidably carried at the outer end of the first frame so that it may move vertically while being maintained in a substantially horizontal position, the mounting of said second frame also being such as to permit pivoting in a substantially horizontal plane, resilient means resisting such horizontal pivoting, said second frame being axially slidable in its mounting, a cultivator attachment carried by said second frame, and means for swinging said first frame for reciprocating the second frame in its mounting, and for driving said cultivator attachment.

8. A cultivator for operating under low objects comprising a mounting vehicle having a power plant for driving the same, a first frame pivoted to said vehicle and constructed to be moved between raised and lowered positions, a second frame carried at the outer end of the first frame on horizontal pivot means, a rotary cutter mounted for projection and retraction on said second frame, a ground engaging member carried at one end of the second frame so that when said second frame is lowered it will accommodate itself to the terrain, and means for raising and lowering the first frame and projecting, retracting, and driving said rotary cutter.

9. An agricultural implement useable for operating above and in contact with the soil comprising supporting structure, an elongated frame mounted on said supporting structure to swing between raised and lowered positions, rotary cutter means, a second frame pivotally mounted on said elongated frame and supporting said cutter, said second frame being swingable toward and from said supporting structure, said second frame being slidable in its mounting to project and retract said cutter means to avoid striking an obstruction and to operate at a variable distance from said supporting structure and power means for swinging said elongated frame, for sliding said second frame, and for driving said cutter.

10. An agricultural implement comprising a mounting vehicle having a power plant for driving the same, a first frame pivoted to said vehicle in a manner to swing from upright to substantially horizontal position, a second frame pivotally mounted on said first frame at a location remote from the pivot of the first frame to the vehicle and swingable in a plane substantially at right angles to said mounting vehicle and being slidable in its mounting to and from said vehicle, said second frame being mounted to follow the inclination of the terrain over which it is operated, and means for supplying fluid power for raising and lowering the first frame and for slidably projecting and retracting the second frame.

11. An agricultural implement comprising a mounting vehicle having a power plant for driving the same, a first frame pivoted to said vehicle in a manner to swing from an upright to a substantially horizontal position, a second frame pivotally mounted on said first frame at a location remote from the pivot of the first frame to the mounting vehicle and swingable in a plane substantially perpendicular to the mounting vehicle, said second frame being slidable in its mounting toward and from said vehicle, an elongated cutter carried by the second frame, means to cause said second frame to follow the inclination of the terrain, and means for supplying power for raising and lowering the first frame and for slidably projecting and retracting the second frame as well as for driving said cutter.

12. The structure of claim 11 in which the cutter has a series of axially disposed spaced spiral blades.

13. An agricultural implement for operating under low objects and comprising supporting structure, first frame means pivoted to said supporting structure and constructed to be moved between raised and lowered positions, second frame means carried adjacent the outer end of the first frame means on horizontal pivot means, rotary cutter means mounted for projection and retraction on said second frame means, ground engaging means carried by said second frame means so that when said second frame means is lowered it will accommodate itself to the terrain, and means for raising and lowering said first frame means and for projecting, retracting and driving said rotary cutter means.

References Cited in the file of this patent

UNITED STATES PATENTS

| | | |
|---|---|---|
| 1,274,499 | Beasley | Aug. 6, 1918 |
| 1,912,706 | Goodman | June 6, 1933 |
| 2,197,305 | Hirak | Apr. 16, 1940 |
| 2,206,283 | Jacobs et al. | July 2, 1940 |
| 2,236,598 | Hautzenroeder | Apr. 1, 1941 |
| 2,291,987 | Rogers | Aug. 4, 1942 |
| 2,473,450 | Rogers et al. | June 14, 1949 |
| 2,539,174 | Baideme et al. | Jan. 23, 1951 |
| 2,574,725 | Berdan | Nov. 13, 1951 |
| 2,619,891 | Sloper | Dec. 2, 1952 |
| 2,630,052 | Jory | Mar. 3, 1953 |
| 2,694,355 | Pertics et al. | Nov. 16, 1954 |

FOREIGN PATENTS

| | | |
|---|---|---|
| 139,958 | Australia | Jan. 17, 1951 |
| 663,494 | Great Britain | Dec. 19, 1951 |